United States Patent

Mathis

[15] 3,653,818

[45] Apr. 4, 1972

[54] PROCESS FOR THE SOLUBILIZATION OF CALCIUM BORATE PRESENT IN BORON MINERALS

[72] Inventor: Pierre Mathis, Dombasle-sur-Meurthe, France

[73] Assignee: Solvay & Cie, Brussels, Belgium

[22] Filed: July 8, 1970

[21] Appl. No.: 53,157

[30] Foreign Application Priority Data

July 10, 1969 Great Britain......................34,848/69

[52] U.S. Cl....................................................23/59, 23/149
[51] Int. Cl. ........................................................C01b 25/00
[58] Field of Search...............................................23/59, 149

[56] References Cited

UNITED STATES PATENTS

| 1,444,989 | 2/1923 | Voss | 23/59 |
| 3,218,120 | 11/1965 | Amodeo | 23/59 |

FOREIGN PATENTS OR APPLICATIONS

| 375,308 | 5/1923 | Germany | 23/59 |
| 19,382 | 0/1891 | Great Britain | 23/59 |

Primary Examiner—Herbert T. Carter
Attorney—Robert E. Burns and Emmanuel J. Lobato

[57] ABSTRACT

A calcium borate mineral is treated with an aqueous boric acid solution, whereby both the calcium components and boron components are dissolved.

6 Claims, 2 Drawing Figures

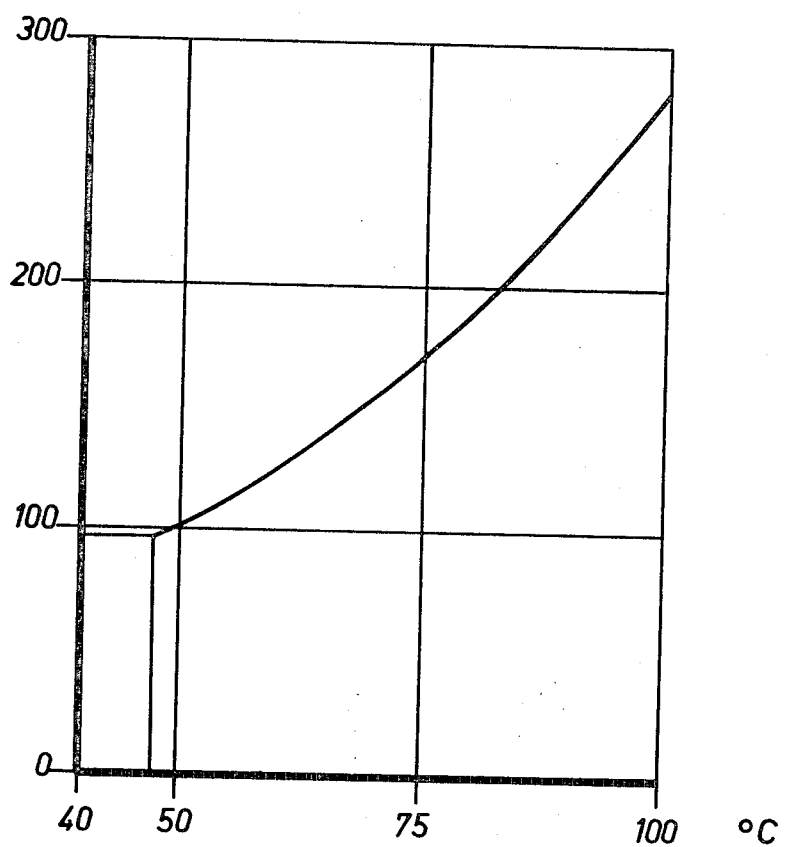
FIG. I

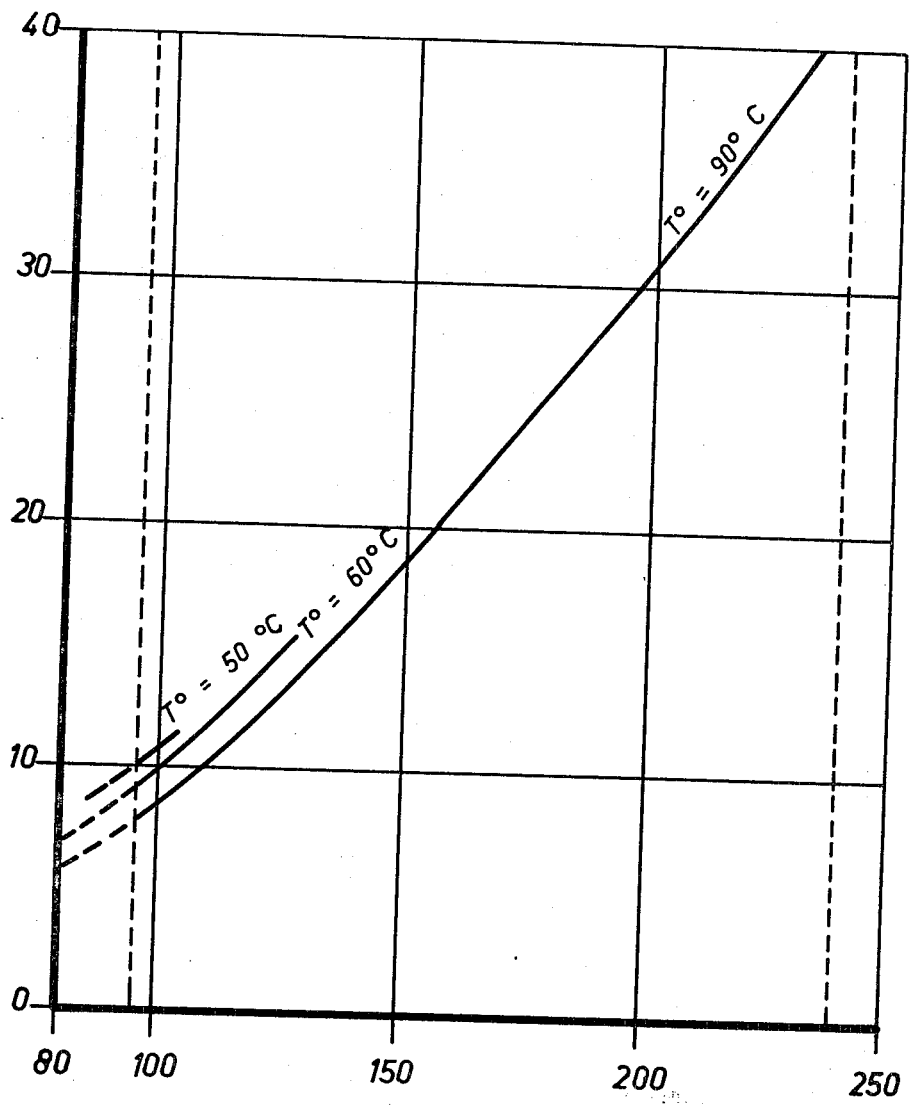
FIG. II

PROCESS FOR THE SOLUBILIZATION OF CALCIUM BORATE PRESENT IN BORON MINERALS

BACKGROUND OF THE INVENTION

This invention relates to the solubilization of calcium borate present in certain boron minerals; more particularly, the present invention concerns the solubilization of calcium borate in boron minerals wherein the boron is principally in the form of calcium borate and which do not contain substantial amounts of sodium borates.

The production of boric acid from the clear liquor obtained by treatment of boron minerals with agents such as sulfuric acid and carbon dioxide is well known. Treating boron-calcium minerals with alkali metal carbonates to prepare alkali metal borates is also known. The object of all of the methods of treating boron minerals up to the present time has been to dissolve the $B_2O_3$ present in the mineral to provide a final clear liquor which contains primarily boric acid or an alkali metal borate, i.e. a boron compound other than calcium borate which is the boron compound most often found in boron minerals.

In German Pat. Nos. 375,308 and 407,745 granted to Schott and Gen., it has been suggested that boronatrocalcite, a sodium-calcium borate having the formula $NaCaB_5O_9 \cdot 8H_2O$ be treated with a solution of boric acid. This procedure yields a sodium pentaborate solution, i.e., a borate solution having a higher content of $B_2O_3$ than that of the sodium borate in the mineral. However, this boric acid treatment leaves the calcium borate in the mineral unchanged and it has been necessary to use an additional reagent, for example, $CO_2$ or $H_2SO_4$, to extract the residual $B_2O_3$ in this process.

Thus, it is not possible to obtain directly, or in a single step, a clear final liquid in which the greater part of both the boron and calcium oxides present in the mineral are dissolved by means of any of the methods of treatment currently known for extracting boron from boron minerals.

SUMMARY OF THE INVENTION

It is an object of the present invention to provide a process whereby both the boron and calcium oxides present in a boron mineral are solubilized so that a clear final liquid containing the major part of the boron and calcium is readily obtained in a simple and economical manner.

According to the invention, a process is provided for treating boron minerals whereby an aqueous solution composed essentially of boron and calcium compounds is obtained. It has been discovered that this can be accomplished by treating a suspension of a boron-calcium mineral with a solution of boric acid.

Surprisingly, it has been found that by using a boron mineral in which the boron is essentially in the form of calcium borate and which does not contain a substantial amount of sodium borate, the calcium borate is readily solubilized by treatment of the mineral with a boric acid solution.

BRIEF DESCRIPTION OF THE DRAWING

FIG. 1 is a diagram showing the variation in the minimum temperature in ° C. as a function of the chosen concentration of boric acid in grams of $H_3BO_3$ per kg. of solution according to the present invention.

FIG. 2 is a diagram which shows the minimum required concentration of boric acid in g./kg. of solution as a function of the quantity of colemanite dissolved in g./kg. of initial solution when the process of the invention is carried out at temperatures of 50°, 60° and 90° C., respectively.

DESCRIPTION OF THE INVENTION

According to the invention, boron minerals in which the boron is essentially in the form of calcium borate and which do not contain a substantial amount of sodium borate are treated with boric acid solutions whereby the calcium borate is readily dissolved. The boron-calcium minerals which are used may contain small amounts of $Na_2O$ bonded with $B_2O_3$ with the ratio of $Na_2O$ to $B_2O_3$ not greater than about 0.1 by weight. The minerals used include, for example, colemanite and pandermite.

In agreement with the disclosures of German Pat. Nos. 375,308 and 407,745, it has been found that solubilization with boric acid is impossible when minerals consisting of boronatrocalcite, i.e., ulexite are employed and more generally, when starting with any boron mineral containing substantial amounts of $Na_2O$.

The concentration of the aqueous solution of boric acid which can be used according to the invention may vary within wide limits. The upper limit of the concentration is the maximum quantity of boric acid soluble at the operation or process temperature. However, surprisingly it has been found that the higher the concentration of the boric acid solution, the greater the amount of mineral which is dissolved.

This being the case, it has been found to be advantageous to carry out the treatment of the calcium borate mineral at elevated temperatures in order that more concentrated boric acid solutions may be used. Preferably, the present process is carried out at a temperature above 40° C., most preferably between about 50° and 120° C. However, good results are obtained even when working at ambient temperatures.

According to the present invention, a highly economical and hence industrial process for treating an ordinary borocalcium mineral such as colemanite, in which the calcium borate is in the form $3CaO \cdot 2B_2O_3 \cdot 5H_2O$, is treated with a basic solution under particular conditions.

By using a boric acid solution for the present process which contains at least 95 g. $H_3BO_3$/kg., a final solution is obtained which contains, in solution, at least 10 g. of colemanite/kg. Below this content of calcium and boron compounds, it is found, in effect, that the quantity of boric acid employed, per unit of colemanite dissolved, becomes too high for a feasible industrial process. Under the desired conditions, it is preferred the maintain the temperature at least equal to 47° C. Also, for reasons of simplicity and economy, it is preferred to maintain the temperature at most at about 100° C. For these reasons, it is preferable to start with a solution of boric acid having a concentration of at least about 40 and preferably about 95 to about 280 g. $H_3BO_3$/kg.

The minimum temperature for carrying out the present treatment at the chosen concentration is then readily determined from the diagram of FIG. 1, whereon the concentration of $H_3BO_3$/kg. of solution has been plotted on the ordinate against the temperature in ° C. on the abscissa.

The minimum required concentration of the boric acid is determined as a function of the calcium borate mineral to be dissolved by means of the diagram of FIG. 2 on which the maximum quantity of $3CaO \cdot 2B_2O_3 \cdot 5H_2O$ dissolved in g./kg. of initial solution as the ordinate has been plotted as a function of the concentration of $H_3BO_3$ in g./kg. on the abscissa for temperatures of 50°, 60° and 90° C., respectively.

Most preferably, the process of the present invention is carried out at a temperature between about 50° to 90° C. using boric solutions having a concentration between about 100 to 240 g. $H_3BO_3$/kg.

As the reaction is fast, the particle size of the calcium borate mineral treated by the process of the invention is not critical. However, it has been found that $\phi < 5$ mm. and preferably $\phi < 1$ mm. are good sizes for industrial practice.

From the solutions obtained in accordance with the invention, calcium borates having high content of $B_2O_3$ may be readily crystallized.

The following examples further illustrate the best mode currently contemplated for carrying out the present invention, however, these examples must not be construed as restricting the scope of the invention in any manner.

EXAMPLES 1-7

EQUIPMENT

In all the examples, use is made of a thermostatically controlled glass tank having a capacity of 2.5 l. which is provided with an agitator fitted with stainless steel blades. Samples of clear liquor are taken therefrom by filtration in situ, with the aid of an immersion tube provided with a filter paper at its end.

METHOD OF OPERATION

For each of the examples, 2,000 grams of an aqueous solution of boric acid of known concentration are poured into the tank. The solution is heated to the selected temperature. One-hundred grams of colemanite are added to the solution, which is kept at the selected temperature, this moment being taken as the zero hour of the process. At certain intervals, samples of the filtered clear solutions are withdrawn and the $B_2O_3$ and CaO contents therein are determined.

DISSOLUTION OF CRUDE COLEMANITE

The starting material comprises crude colemanite which is crushed and passed through an 0.250 mm. screen.

Chemical analysis: $B_2O_3$ : 45 percent by weight CaO : 24.8 percent by weight.

Two temperatures, 90° and 140° C., are employed.

The results of Examples 1–3 are set forth in Table 1.

TABLE 1

| Example No. | Temperature °C. | Duration of Treatment in Minutes | $B_2O_3$ g./kg. | CaO— g./kg. |
|---|---|---|---|---|
| 1 |  | 0 | 39.5 | 0 |
|  |  | 5 | 41.8 | 1.11 |
|  |  | 60 | 41.6 | 1.07 |
|  |  | 120 | 42.0 | 1.09 |
| 2 | 90 | 0 | 107.8 | 0 |
|  |  | 5 | 118.4 | 7.45 |
|  |  | 20 | 119.0 | 7.60 |
|  |  | 40 | 118.8 | 7.40 |
| 3 | 140 | 0 | 40.0 | 0 |
|  |  | 10 | 41.7 | 0.9 |
|  |  | 60 | 41.9 | 0.96 |
|  |  | 120 | 42.0 | 1.03 |

Comparisons of Examples 1 and 2 shows that at constant temperatures, an increase in the concentration of boric acid at the start ($B_2O_3$ content at zero hour) markedly increases the rate of solubilization of the colemanite.

Comparisons of Examples 1 and 3 shows that a constant concentration of boric acid, raising of the temperature from 90° to 140° C. does not substantially change the rate of solubilization of the colemanite

DISSOLUTION OF CALCINED COLEMANITE

The starting material comprises colemanite calcined at a minimum temperature of 500° C. for 2 hours.

Chemical analysis: $B_2O_3$ : 58.7 percent by weight CaO : 32.3 percent by weight Temperatures of 90° and 50° C. are employed.

Examples 4–7 were carried out and gave the results as shown in Table 2.

TABLE 2

| Test No. | Temperature °C. | Duration of Treatment in Minutes | $B_2O_3$ g./kg. | CaO g./kg. |
|---|---|---|---|---|
| 4 | 50 | 0 | 41.3 | 0 |
|  |  | 10 | 50.6 | 5.35 |
|  |  | 30 | 50.6 | 5.52 |
|  |  | 60 | 51.0 | 5.58 |
| 2 | 50 | 0 | 6.50 | 0 |
|  |  | 5 | 77.8 | 7.9 |
|  |  | 50 | 81.2 | 10.0 |
|  |  | 100 | 81.2 | 10.0 |
| 6 | 90 | 0 | 40.2 | 0 |
|  |  | 5 | 47.0 | 3.84 |
|  |  | 30 | 47.8 | 4.23 |
|  |  | 60 | 47.4 | 4.10 |
| 7 | 90 | 0 | 100.1 | 0 |
|  |  | 5 | 120.7 | 12.9 |
|  |  | 20 | 121.3 | 13.2 |

EXAMPLE 8

COMPLETE EXAMPLE OF DISSOLUTION

Two-thousand grams of an aqueous solution containing 109.4 g. of $B_2O_3$/kg. are poured into the apparatus described for the previous examples. To this solution, which is heated to 90° C., there are added 53 g. of crude colemanite containing by weight:

45 percent of $B_2O_3$ 24.8 percent of CaO.

If the solubilization of the calcium borate were complete, there should then be obtained a final solution containing:

118.5 g./kg. $B_2O_3$ 6.4 g./kg. CaO.

Agitation is stopped after 20 minutes and the clear liquid analyzed. It contains:

118.0 g./kg. $B_2O_3$ 6.2 g./kg. CaO.

The dissolution of the colemanite was therefore effected with a yield of 97 percent.

What I claim as new and desire to secure by Letters Patent is:

1. A method for solubilizing the calcium borate in a calcium borate mineral which contains $Na_2O$ bonded with $B_2O_3$ in a ratio by weight of $Na_2O$ to $B_2O_3$ of up to 0.1 and to obtain thereby an aqueous solution composed essentially of boron and calcium compounds which comprises
   suspending said calcium borate mineral in an aqueous solution containing boric acid as the only solubilizing agent at a temperature of at least about 40° C., said boric acid being present in solution in an amount of about 40 g. per kilogram of solution to the maximum concentration soluble at the selected process temperature whereby calcium and boron compounds contained in said mineral are dissolved and
   separating the aqueous solution containing said calcium and boron compounds from any undissolved mineral material to obtain a clear solution of said boron and calcium compounds.

2. A process according to claim 1, in which the concentration of said boric acid solution is about 40 g. to 280 g. of boric acid kilogram of solution.

3. A process according to claim 1 in which the concentration of said boric acid solution is about 95 g. to 280 g. of boric acid per kilogram of solution.

4. A process according to claim 1 in which said calcium borate mineral is colemanite.

5. A process according to claim 1 in which the aqueous boric acid solution is maintained at about 40° to 120° C.

6. A process according to claim 1 in which said calcium mineral is colemanite and in which the temperature of the boric acid solution is maintained at about 50° to 90° C. and the concentration of said boric acid solution is about 100 to 240 g. $H_3BO_3$ per kilogram of solution.

* * * * *